(12) United States Patent
BenHadda et al.

(10) Patent No.: US 6,366,904 B1
(45) Date of Patent: Apr. 2, 2002

(54) MACHINE-IMPLEMENTABLE METHOD AND APPARATUS FOR ITERATIVELY EXTENDING THE RESULTS OBTAINED FROM AN INITIAL QUERY IN A DATABASE

(75) Inventors: Hamid BenHadda; Jean-Francois Marcotorchino, both of Paris; Didier Otthoffer, Chevilly Larue, all of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,052

(22) Filed: Nov. 25, 1998

(30) Foreign Application Priority Data

Nov. 28, 1997 (EP) .............................. 97480086

(51) Int. Cl.⁷ .............................................. G06F 17/30
(52) U.S. Cl. ...................... 707/3; 707/4; 707/5; 707/8; 707/101; 707/102
(58) Field of Search .................. 707/3, 4, 5, 8, 707/10, 101, 102, 104

(56) References Cited

U.S. PATENT DOCUMENTS

| | | | | |
|---|---|---|---|---|
| 4,939,689 A | * | 7/1990 | Davis et al. ................. | 364/900 |
| 5,297,280 A | * | 3/1994 | Potts, Sr. et al. ........... | 395/600 |
| 5,546,455 A | * | 8/1996 | Joyce et al. ................. | 379/265 |
| 5,671,404 A | * | 9/1997 | Lizee et al. ................. | 395/605 |
| 5,873,075 A | * | 2/1999 | Cochrane et al. .............. | 707/2 |

* cited by examiner

*Primary Examiner*—Thomas Black
*Assistant Examiner*—Thuy Do
(74) *Attorney, Agent, or Firm*—R. Bruce Brodie; Marc D. McSwain

(57) ABSTRACT

A machine-implementable method and apparatus for automatic extension of results obtained by querying a database of relationally organized data and expressed in tabular row and column format. The method involves modifying the query by adding column variables to the query that show a high association with the initial query designated variables. The modified query is then used to access the table. This repeats until a stop condition is sensed. Tuples of values elicited responsive to the modified query are included in an extended response if they are significantly similar to tuples elicited by the original query. Several association and similarity modes are described by which the number of variables and tuples can be reiteratively extended.

13 Claims, 7 Drawing Sheets

TABLE "DATA-DICTIONARY"
27

| COLUMN | TYPE | NB VAL | VAL LIST | A.FLAG | S.FLAG |
|---|---|---|---|---|---|
| NAME | CHAR | 7 | - | NO | - |
| SEX | CAT | 2 | M, F | YES | 1 |
| AGE | QUAN | - | - | YES | 3 |
| MARRIED | BIN | 2 | YES, NO | YES | 2 |
| SALARY | QUAN | - | - | YES | 3 |
| STATE | CAT | 51 | NY, CA... | YES | 1 |

| SMITH | 1 | 25 | YES | 25000 | NY |
|---|---|---|---|---|---|
| JONES | 2 | 43 | NO | 28000 | CA |
| McLEAN | 1 | 29 | NO | 26000 | WY |
| ARTHUR | 2 | 32 | YES | 30000 | VT |
| SIGLI | 2 | 41 | YES | 32000 | CA |
| STEIGER | 1 | 33 | YES | 29000 | CO |
| JOHN | 2 | 40 | NO | 31000 | CA |

TABLE "FACTS" 26

RELATIONAL DATABASE 25

EXTENSION PROCESS TABLES

ASSOCIATION TABLE SxS̄ and SxS
29

| | SEX | AGE | MARRIED | SALARY | STATE |
|---|---|---|---|---|---|
| SEX | | | | | |
| AGE | | | | | |
| MARRIED | | | | | |
| SALARY | | | | | |
| STATE | | | | | |

TABLE "VAR. EXTENSION" 28

| COLUMN | SELECTED | EXTENSION |
|---|---|---|
| NAME | Y | - |
| SEX | Y | N |
| AGE | Y | N |
| MARRIED | N | Y |
| SALARY | N | N |
| STATE | N | Y |

FIG. 2

MACHINE-IMPLEMENTABLE METHOD AND APPARATUS FOR ITERATIVELY EXTENDING THE RESULTS OBTAINED FROM AN INITIAL QUERY IN A DATABASE

FIELD OF THE INVENTION

This invention relates to querying computer-stored databases, and more particularly to enhancing the likelihood of accessing a query acceptable result without requiring additional query modification by the user.

DESCRIPTION OF RELATED ART

In this specification, a database is defined as a collection of data items organized according to a data model and accessed via queries. The present invention applies to any data model; however, it is illustrated in terms of the relational data model. The relational model was proposed by E. F. Codd in "A Relational Model of Data for Large Shared Data Banks", *Communications of the ACM*, Vol. 13, No. 6, June 1970, pp. 377–387. Codd argued that a collection of tables or relations could be used to model real world items and to hold data about them.

In a relational database, data values are organized into columns or fields wherein each column comprises one attribute of the relation. Each column or attribute of the relation has a domain which consists of data values for that attribute. Each row of the relation, which includes one value from each attribute, is known as a record or tuple. The relational model differs from network and hierarchical models in that it does not use pointers or links. Instead, the relational model relates tuples by the values that they contain. This allows a formal mathematical foundation to be defined. Thus, a relational database can be said to be formed from a collection of relations, each of which is assigned a unique name, and which can be expressed in the form of tables. Each row in a table represents a relationship among the attributes. In this specification the terms "row", "record", and "relation" as applied to relational tables are used synonymously.

Two different languages describe a database system. Namely, one language specifies a database scheme, and the other language is used to recite database queries and updates. As to the first, a database scheme is specified by a set of definitions expressed by a data definition language (DDL). The results of compilation of DDL statements are a set of tables that are stored in a special file called either a "data dictionary" or a "data directory". Significantly, the data dictionary contains metadata. That is, the data dictionary defines each attribute in a table in terms of its type, range, etc. The dictionary is consulted before actual data is read or modified in the database.

As to the second language involved in databases, a data manipulation language (DML) enables users to access or manipulate data as organized by the appropriate data model. A procedural DML requires a user to specify what data is needed and how to access the data. One example of a procedural query language associated with relational databases is "relational algebra". It consists of a set of operations that take one or two row relations as input and produce a new relation as their result. Fundamental operations in the relational algebra include select, project, union, set difference, Cartesian product, and rename. Other operations include set intersection, natural join, division, and assignment.

A nonprocedural DML requires only that a user specify what data is needed without specifying how to access the data. In this regard, it should be appreciated that a "query" is a statement requesting the retrieval of information. Also, the portion of the DML that involves information retrieval is called a "query language". Unfortunately, it is common practice to use the terms "query language" and "data manipulation language" synonymously.

One form of user-friendly nonprocedural-like DML is known as "structured query language" (SQL). It uses an artful combination of relational algebra and calculus constructs. It includes features for defining the structure of the data, for modifying data in the database, and for specifying security constraints. The basic structure of an SQL expression includes the three clauses "SELECT", "FROM", and "WHERE". The clauses and their contents define predetermined query patterns. In this regard, a query is a search statement which defines the criteria that data in the form of tuples must meet in order to be part of the answer or response of the database to the query. In SQL, a query is formatted as follows:

SELECT $y_1, y_2, \ldots, y_m$

FROM table X

WHERE conditions on $(y_1', y_2', \ldots, y_m')$

The FROM clause defines the particular table(s) or set of relations in the database, denominated table X, within which the search in satisfaction of the query is to be conducted.

In the SELECT clause, the attributes $y_1-y_m$ are the columns (variables) in that table X defined by the query to appear in the resulting display or printout.

In the WHERE clause, a predicate is set out where $y_1'-y_m'$ are the columns (variables) in the table expressing conditions or constraints that must be satisfied in order for a relation or record to be part of the result or answer.

It should be noted that the subset of attributes (columns $y_1-y_m$) in the SELECT clause may be different from the subset of attributes (columns $y_1'-y_m'$) in the WHERE clause. This means in practice that the result may recite only certain columns of the records found which is not necessarily the same as the columns on which the search for the records was based. The two sets of columns may thus totally or partially overlap or they may be completely distinct.

At the present time, the results returned by a database responsive to a query require that the user analyze the retrieved data quantitatively and qualitatively. Frequently, the query is modified, applied to the database, and the results again evaluated. The overall process is reiterative, manually intensive, distractive, and consumptive of significant computational and storage resource.

In the prior art, several processes are known which interactively aid the user in query modification during one or more iterations. Reference should be made to Fleischman et al., U.S. Pat. No. 5,388,259, "System for Accessing a Database With an Iterated Fuzzy Query Notified by Retrieval Response", issued February 7, 1995; and Li et al., U.S. Pat. No. 5,608,899, "Method and Apparatus for Searching a Database by Interactively Modifying a Database Query", issued Mar. 4, 1997.

Fleischman discloses that a statistical membership function between retrieved values and particular attributes (column variables) can be used to electronically identify selected ones of the retrieved values in order to satisfy imprecise queries. The results are then ordered according to the strength of their membership function. More particularly, a retrieved value either exactly satisfies a precise predicate or fails to. The satisfaction may be represented by a Boolean logical 1, while the failure to satisfy may be represented by a Boolean logical 0. In contrast, an imprecise predicate cannot usually identify with certainty whether retrieved data, which by its nature, is ambiguous or difficult to quantify exactly. The resolution of such ambiguity is treated by fuzzy set theory. Although the system of this disclosure flexibly defines search criteria and assists in interpreting retrieved values, it does not expand the exploration beyond the bounds defined in the original query.

Li discloses an arrangement for graphically displaying returned values in at least two dimensions responsive to a separately displayed database query. A user can interactively modify the query by graphically adjusting the bounds of the displayed search predicate, i.e., SQL WHERE clause. In this regard, Li, as does Fleischman, aids in flexibly redefining search bounds within the scope of the original query.

SUMMARY OF THE INVENTION

It is accordingly an object of this invention to devise a machine-implementable method and apparatus for automatically extending the scope of a query search utilizing both retrieved values and association with variables not specified in the original query.

It is another object of this invention that such machine-implementable method and apparatus display retrieved values which either satisfy the query predicate or exhibit a substantial similarity to those retrieved values that satisfy the query predicate.

It was unexpectedly observed that a machine-implementable method and apparatus could be used to reiteratively extend the scope and the results of the query (a) if machine selected, strongly associated, not-previously-selected variables were added to a modified query; and (b) if the extended tuples of values resulting were filtered through a machine-based similarity evaluation among rows, records, or relations.

More particularly, the foregoing objects are believed satisfied by a machine-implementable method for automatic extension of results obtained by querying a database of relationally organized data expressed in tabular row and column format. Each database table includes a plurality of rows (tuples) and a plurality of columns (variables) defined over counterpart domains of values. In the method of the invention, a formatted query designating at least one table, at least one column variable, and at least one predicate constraint is applied to the designated table and tuples of values satisfying the predicate constraints are retrieved. Next, indexes of association among the previously selected and nonselected column variables are computed. After this, the formatted query is modified to include those nonselected column variables having respective indexes of association exceeding a predetermined threshold and the table reaccessed with the modified query. These steps are repeated until a stop condition occurs.

During each iteration, values of similarity are computed among the tuples returned by the modified query from the designated table. The tuples are then filtered in that only those tuples substantially similar to tuples originally elicited are added to the query return. This ensures that any tuples elicited by way of the added variables have a substantial likelihood of being of interest in satisfaction of the query. Since the stop conditions are extrinsically supplied, the duration of the method is always user controllable.

BRIEF DESCRIPTION OF THE DRAWINGS

FIG. 2 shows a simplified example of a relational database to which the invention is applicable and examples of tables that are built in the implementation of the invention.

DESCRIPTION OF THE PREFERRED EMBODIMENT

The querying of a database system by a user is an inexact and reiterative process by which semantic-valued terms and conditions are applied to the machine-run database, notwithstanding the fact that pathways for selecting, staging, and presenting the resulting data are transparent. In the following paragraphs, the various steps of the method and apparatus of the invention of a preferred embodiment are described. These provide for extensibility of the results of any query by association with variables not originally selected, and similarity between prior records and records not otherwise within the scope of the query.

Figure 1:
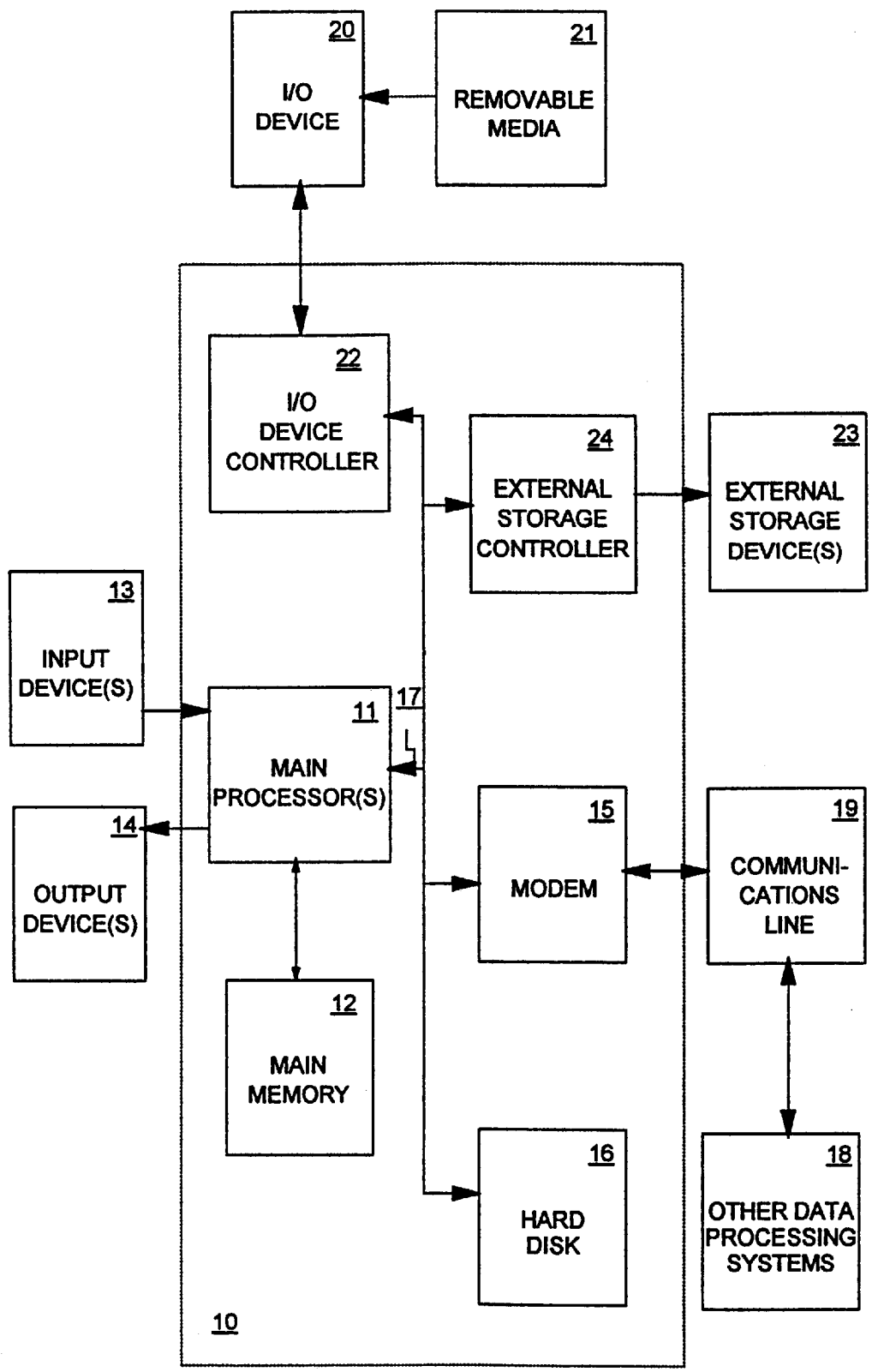
FIG. 1 sets out a block diagram of a typical digital computer utilized by a preferred embodiment of the invention.

Referring now to FIG. 1, there is shown a block diagram of atypical digital computer utilized by a preferred embodiment of the invention. The computer includes one or more main processors 11 coupled to a main memory 12 in computer box 10 with input device(s) 13, such as a keyboard, and output device(s) 14, such as a display monitor or a printer attached. A modem or other communications adapter 15 and a hard disk 16 may also be located in computer box 10 to provide communications with main processor 11 across bus 17. Modem 15 may communicate with other data processing systems 18 across communications line 19. Computer-readable removable media 21, such as a magnetic diskette or a compact disc, may be inserted into an input/output device 20, such as a disk drive or a CD-ROM (compact disc read-only memory) driver. Data is read from and written to the removable media by the I/O device under the control of I/O controller 22, which communicates with main processor 11 across bus 17.

The system may also include an external storage device 23, such as a disk or cartridge file, under the control of external storage controller 24. Main memory 12, hard disk 16, removable media 21, and external storage device 23 are all referred to as memory for storing data or programs for processing and use by processor 11. A database may be stored on hard disk 16 or in other memory units attached to computer box 10. The database may alternatively be stored in any of remote data processing systems 18 and made accessible to main processor 11 through modem 15 and communications line 19. A user wishing to access the database would enter queries at input device 13 and receive results at output device 14. Main processor 11 handles database operations under control of a database management system (not shown) which is part of its internal programs, along with the operating system, or which is in the form of an application program stored in memory.

Referring now to FIG. 2, there is shown a simplified example of a relational database to which the invention is applicable and examples of tables that are built in the implementation of the invention. As previously explained, a relational database is organized as one or more tables. Each table defines the relation between rows of the table (also called "records") and values that the rows/records present for a given set of variables (columns of the table). In the example, the records appearing as lines in table 26, entitled "Facts", contain a series of attribute values for a number of variables, each variable being allocated a separate column. Going from left to right, the variables in this example are: name, sex, age, married status, salary, and state of residence. Table 27, entitled "Data Dictionary", is also part of database 25 and contains more information about the variables of table 26.

The leftmost column in the "Data Dictionary" or table 27 lists the columns of table 26 as indicated by the arrows linking the two tables. The second column from the left indicates the type of the particular variable as will be explained more fully later. The next one indicates, where appropriate, the number of different values the variable can take; the one after lists these different values, again where appropriate; and the last two columns are association (A. FLAG) and similarity (S. FLAG) flags, the purpose of which will be explained later.

Variables can be classified according to different types, and the classification retained in the preferred embodiment of the invention is one used in current work on the similarity theory. This is not intended as limitative and other classifications could be used. Some variables are called continuous or quantitative: this is the case for the variables "age" and "salary" in the example of FIG. 2. Quantitative variables can take a large number of different values that cannot be properly listed. For these variables, the type is shown as QUAN in the second column of table 27 and neither the number of different values nor the different values themselves appear in the following two columns.

Other variables can take only a limited number of values: they are called qualitative variables. This is the case for the variable "sex" which can be Female or Male (in similarity theory language this type is called categorical single-valued, abbreviated as CAT in the second column of table 26). The variable "State" is another qualitative variable of the categorical, single-valued type, which can take 51 different values, as indicated in the third column of table 27, which values are listed in the fourth column of table 27. Another type of qualitative variable shown in table 27 is the binary type (BIN), of which the "married status" is an example, with two values: Yes and No.

Other types of variables are not shown in the given example but could appear in a real database, for example, the categorical multivalued type, such as "credit cards" issued to the "person"; or the ordered type, such as "opinion of the person on a given product among a limited list of possible expressions of that opinion: Fond of/Like it/Why not/Hate it". Lastly, some variables are only information characters, not usually utilized in the WHERE clause of a query. This is the case of the variable NAME in table 27. This type of variable is noted "CHAR".

The bottom part of FIG. 2 shows two tables, Variable Extension table 28 and Association table 29, which are built as part of the extension process of the invention and are stored in memory during that process.

Figure 3:
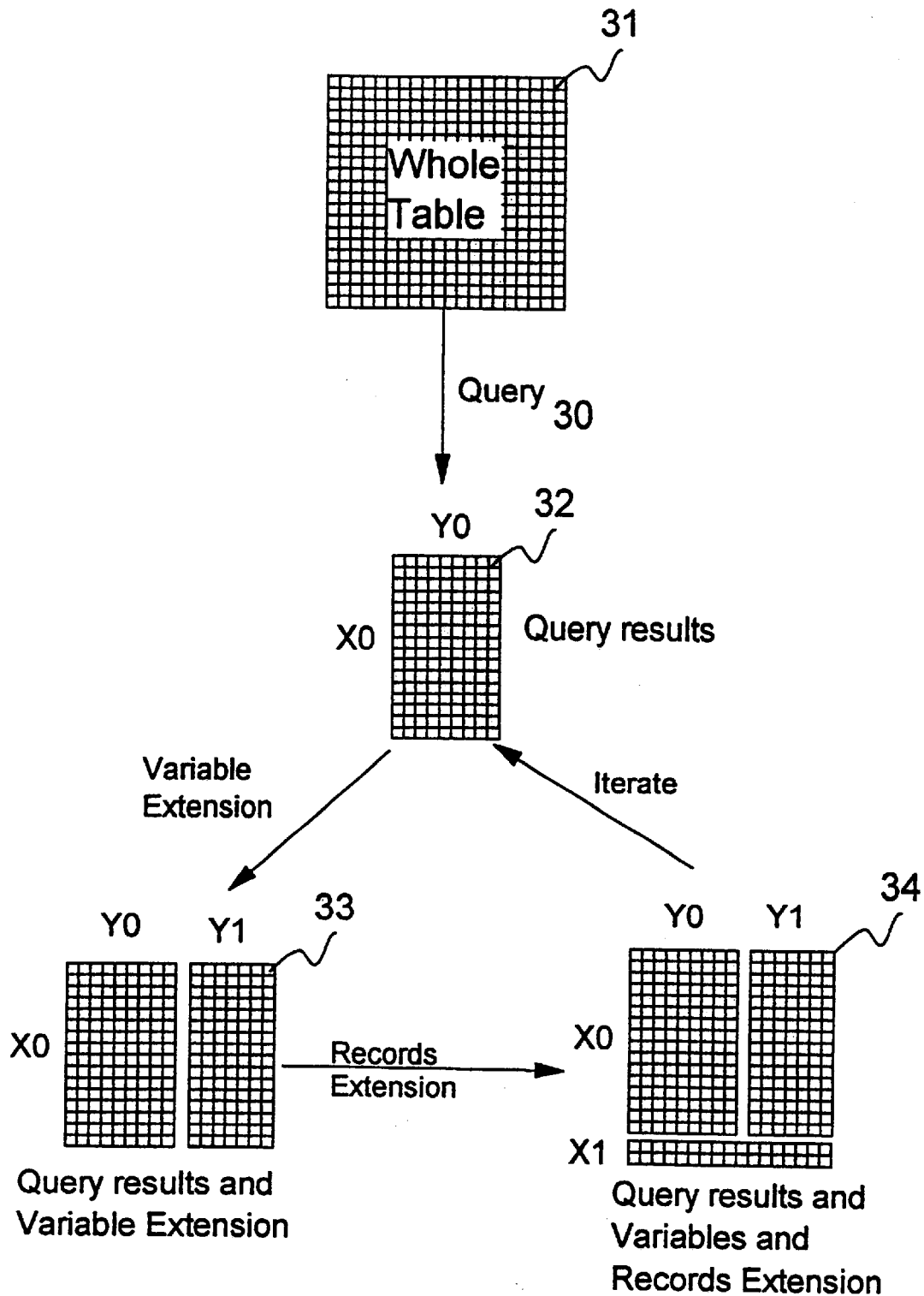
FIG. 3 exhibits an overview of the query extension process according to the invention.

Referring now FIG. 3, there is shown an overview of the query extension process according to the invention. The starting point is a query 30 entered by the user which she or he has designed as a working hypothesis for solving a particular problem or conducting a particular study. As indicated in the Background section herein, the query will usually be expressed in SQL language and look broadly as follows:

SELECT variables y
FROM table X
WHERE variables y_meet stated conditions

The table identified in the FROM clause of query 30 appears as Whole table 31 in FIG. 3. After processing of the query, the results, as ready for presentation to the user, appear as a table 32, which is a subset of Whole table 30 and in which the rows X0 are the records which satisfy the conditions stated with respect to variables y_in the WHERE clause of the query, and the columns Y0 are the attribute values in these records for the variables y selected in the SELECT clause of query 30. This is the usual mode of operation of a relational database. As an example, based on the simplified database shown in FIG. 2, a query prepared by a user conducting, say, a consumer profile study, could be SELECT name, sex, age
FROM table Facts
WHERE salary $\geq 29000$ AND age $\leq 40$ The results would be a table showing the records "Arthur", "Steiger", and "John" with their values for variables "sex" and "age".

The method of the invention provides for an extension of the query results in either or both dimensions: the variable dimension and the record dimension. Extension in the variable dimension leads to a new table, shown as table 33 in FIG. 3, which is table 32 to which further columns Y1 have been added. Extension in the record dimension then leads to another table, shown as table 34, which is table 33 to which further records X1 have been added. The extension process may be repeated in an iterative manner as shown.

Figure 4:
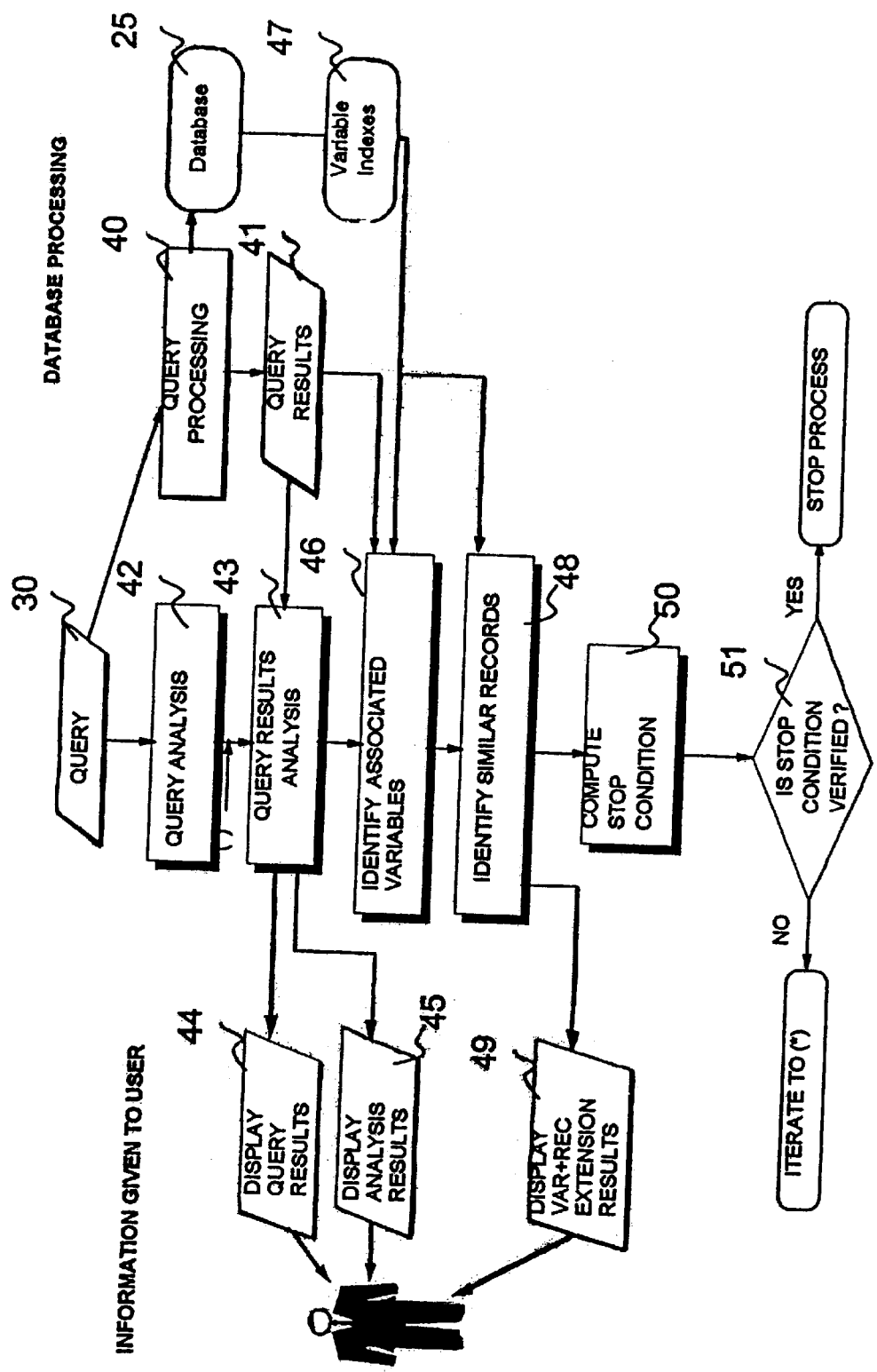
FIG. 4 illustrates the steps involved in generating and performing extended queries according to the invention.

Referring now to FIG. 4, there are shown the steps involved in generating and performing extended queries according to the invention. The process starts with an initial query 30 from the user. The query is processed at step 40 by means of processor 11 (FIG. 1) and database 25 and produces query results 41. Initial query 30 is analyzed at step 42, as will be more fully described in relation to FIG. 5. At step 43, query results 41 and the results of query analysis 42 are analyzed using classical query autoanalysis techniques, which are not part of this invention. The user is then presented with a display 44 of query results 41, together with a display 45 of the results of the analysis at step 43. At this stage, the process may continue either automatically as shown in FIG. 4 or as a result of a decision of the user indicated by an appropriate action on the computer keyboard or via a mouse click on a portion of the display screen, using techniques well known to the skilled person.

Referring again to FIG. 4, at step 46, variables which are not part of the set of variables selected for display by the user in the initial query (i.e., variables not part of the SELECT clause in the query) but which can be correlated or otherwise associated with them are identified. The correlation or association process will be described later in relation to FIG. 6. The identified set of associated variables, referred to as Y1 in FIG. 3, can be kept for later use at the end of the current round of the extension process, as shown in FIG. 4. It can also be immediately displayed to the user in the form of a table as shown under reference 33 in FIG. 3. The process then goes on to step 48, either automatically or as a result of an indication given by the user if a table 33 has been displayed, as already mentioned with respect to display actions 44 and 45. At step 48, records are identified which did not appear in the displayed results 44 because they failed to meet one or more of the criteria set by the user in the WHERE clause of the query but which can be considered as similar to them. The similarity identification process will be described later in relation to FIG. 7.

The full results 49 of the current round of the extension process are then displayed to the user. The process then checks at step 50 whether a stop condition is obtained. The stop condition may be built into the association process to be described with reference to FIG. 6 or into the similarity identification process of FIG. 7 or it may result from a decision of the user expressed as a keyboard stroke or a mouse click. If the stop condition is detected at step 51, the process ends. If not, the process iterates to step 43 for a new round of extension. Variable indexes 47 may be used instead of full database records to speed up the processing at steps 46 and 48.

Figure 6:
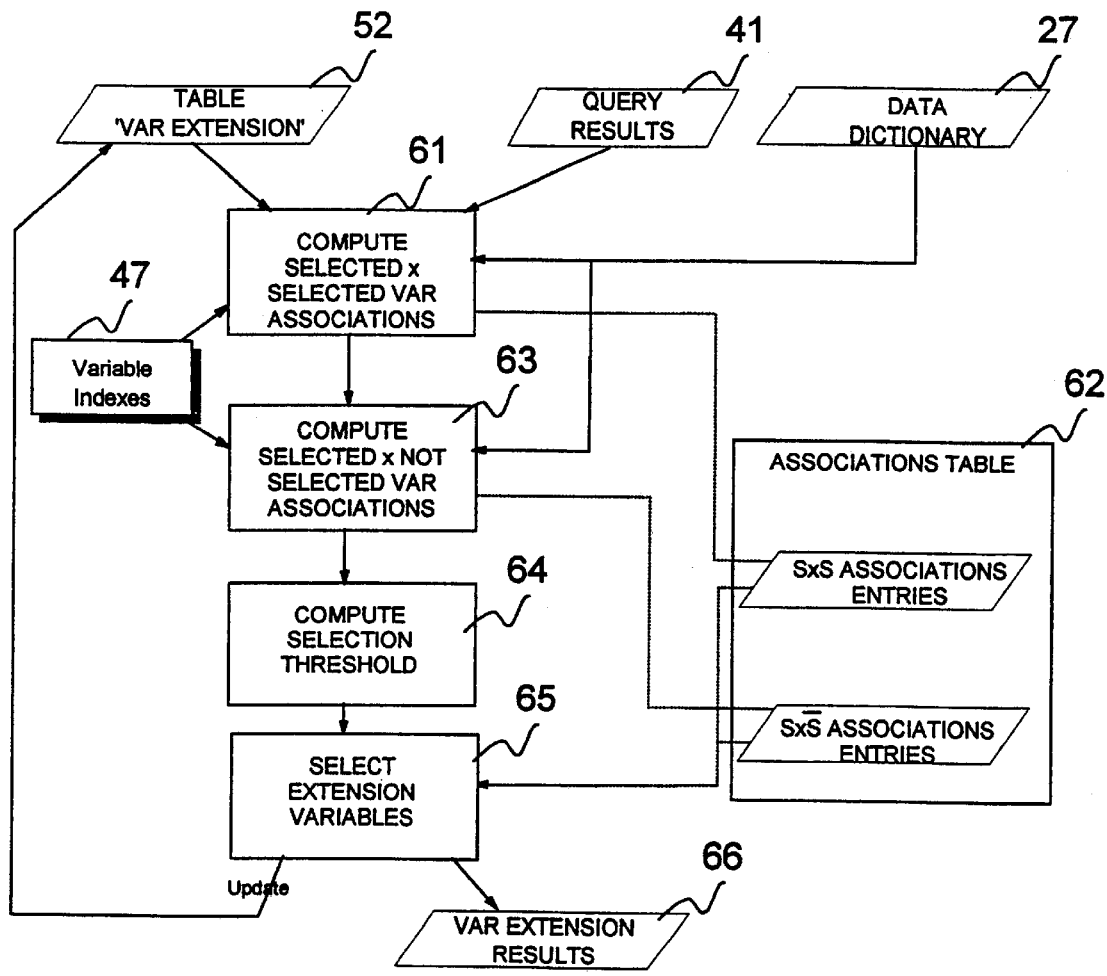
FIG. 6 schematically illustrates a process for creating a variable extension table to be used in the variable extension process of FIG. 7.

Referring now to FIG. 4 when taken together with FIG. 6, there is shown the variable extension process and the process for building the variable extension table according to the method of the invention. This is a correlation/association process leading to an extension Y1 in the variable (column) dimension.

Figure 5:
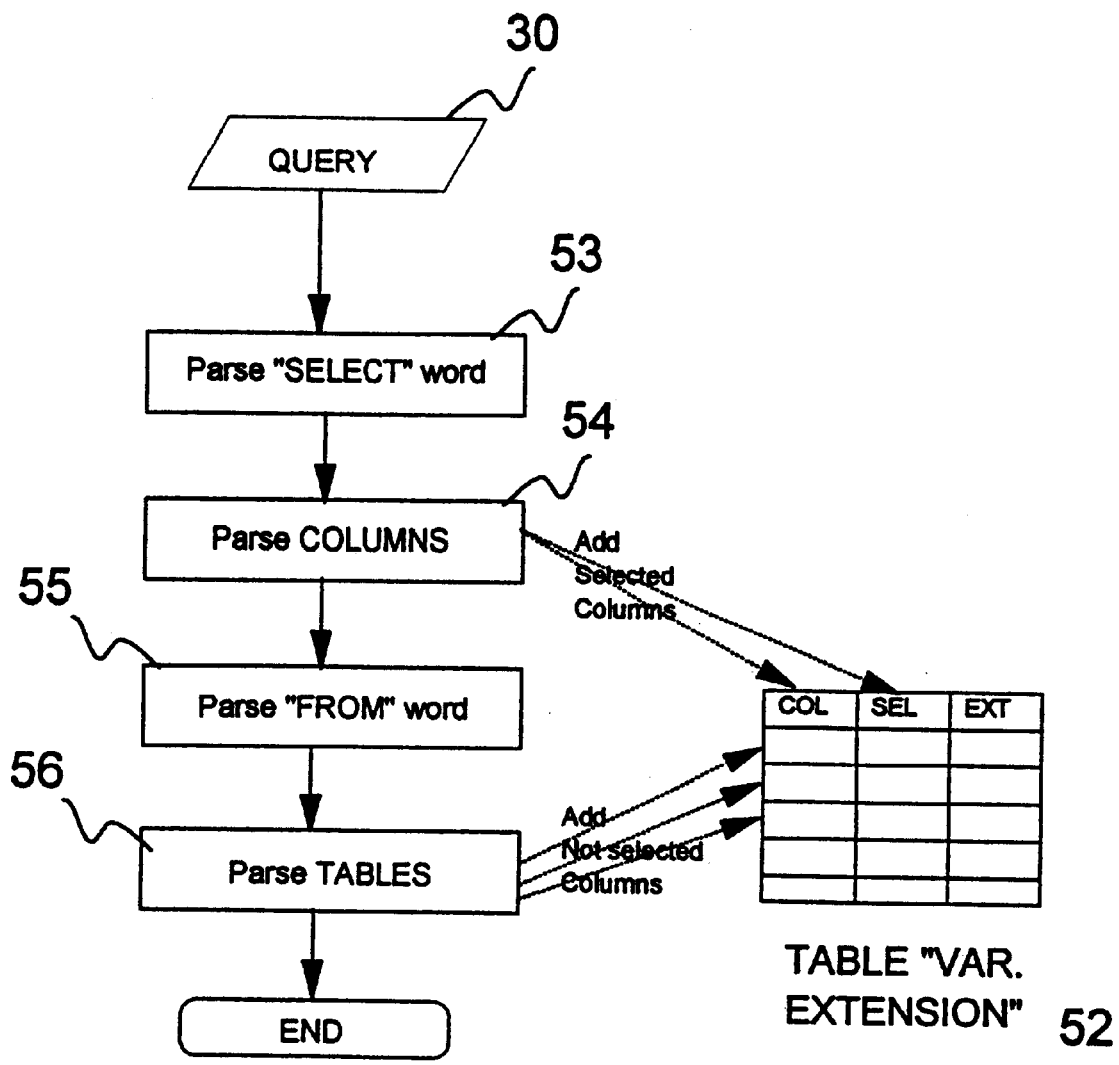
FIG. 5 schematically depicts the variable extension process according to the invention.

In the preferred embodiment, the process includes the creation of a Variable Extension table shown as table 52 in FIG. 5. Part of table 52 is built up on the basis of an analysis (step 43 in FIG. 4) of the initial query 41 designed by the user. The process starts with parsing the SELECT word at step 53 and then the selected variables (or columns) y at step 54. The names of the selected columns are stored in the COL column of table 52 and an indication that they were selected is stored in the SEL column of table 52. At the next steps 55 and 56, the FROM word and the name of the table are parsed to identify all the columns which are part of the table identified in the FROM clause. The names of the columns which were not already stored at step 54 are then added to the COL column of table 52. This results in the COL column of table 52 containing the whole list of columns in Data Dictionary table 27 (FIG. 2) and the skilled person will understand that the list could have been transferred from table 27 instead of being derived from the parsing steps described here.

Table 52 contains a third column, noted EXT, which stores an identification of the extended columns resulting from the variable extension process which will now be described with reference to FIG. 6. The variable extension process utilizes Data Dictionary table 26 and the left and middle columns of Variable Extension table 52 to define the total set of variables Y, the set of selected variables S, which is a subset of Y, and the set of nonselected variables which is Y−S. At step 61, the variables of set S are associated with the variables of the same set S and association indexes are computed and stored as S×S Association Entries in Association table 62. The results are utilized to highlight the correlated or otherwise associated variables among the set of selected variables. At step 63, the variables of set S are associated with the variables in set S' and association indexes are computed and stored as S×S' Association Entries in Association table 62. The results are utilized to sort the nonselected variables by decreasing order of correlation/association with the selected variables.

At step 64, an association threshold or limit is computed and the nonselected variables showing association indexes above the limit are retained at step 65 for use and presentation as extension variables. The retained variables are then identified in the right column, noted EXT, of table 52 (FIG. 5). It may be, however, that certain variables are considered generally not suitable for an extension analysis, for example, because they would never lead to a useful broadening of the initial query. In the preferred embodiment of the invention, these variables are identified by a NO flag in the A. FLAG column of Data Dictionary table 27 (FIG. 2) and they are ignored in the variable extension process. Computations at steps 61 and 63 may be based on variable indexes or feature identifiers 47 instead of full database records.

Referring again to the bottom part of FIG. 2, table 28 is an example of Variable Extension table 52 of FIG. 5, based on the above-mentioned example of a query in the simplified database shown in the top part of the figure. At the end of the process of FIG. 5, the first column of table 28 contains the names of all the variables in the database, and the second column contains an indication of those columns which were selected in the SELECT clause of the query (the selected columns, namely "name", "sex", and "age" are identified with a Y while the nonselected show an N). At the end of the process of FIG. 6, the third column of table 28 contains the identification of the extended variables (columns) retained by the variable extension process. For this example, the extension variables have been assumed to be "married status" and "State", identified with a Y in the third column. As explained with respect to FIG. 6, the variable extension process requires computations of association indexes which are stored in Association table 62, an example of which is shown as table 29 in FIG. 2. For obvious reasons, no actual computation results are shown in table 29 but it will be clear from the description of FIG. 6 that these computation results would be the basis for the selection of the two extension variables shown in table 28.

The preferred association techniques to be used for the implementation of the invention depend on the type of variables considered. The following Table 1 shows the various techniques used in the preferred embodiment as a function of the types of the variables involved in the association. If the two variables are of the quantitative type (top left box), traditional correlation computing techniques are utilized. If one variable is of the quantitative type while the other is of the qualitative type (top right and bottom left boxes), standard deviation index computing techniques are appropriate. If both variables are of the qualitative type (bottom right box), different indexes can be computed as shown. It will be understood by those skilled in the art that other association techniques could be utilized without departing from the spirit and scope of the invention.

TABLE 1

| Type of Variable | Quantitative (Continuous) | Qualitative (Categories) |
|---|---|---|
| Quantitative (Continuous) | Correlation Computing | Standard Deviation Index Computing |
| Qualitative (Categories) | Standard Deviation Index Computing | $\chi^2$, Rand, Goodman-Kruskal Index Computing |

The detailed index computations are shown in the following Table 2.

TABLE 2

| Used for | Name | Formula | Limit formula |
|---|---|---|---|
| Qual × Qual | $X^2$ | $N\left(\left(\sum_u \sum_v \dfrac{n_{uv}^2}{n_u, \%n_v}\right) - 1\right)$ | $(1.65 \times \sqrt{v} - v + 1)^3$ where $v = \dfrac{2}{9 \times (D_u - 1) \times (D_v)}$ |

TABLE 2-continued

| Used for | Name | Formula | Limit formula |
|---|---|---|---|
| Qual × Qual | Goodman-Kruskal | $$\frac{\sum_u \sum_v \frac{n_{uv}}{N \times n_u} - \sum_v \frac{n_v^2}{N^2}}{1 - \sum_v \frac{n_v^2}{N^2}}$$ | Used for analysis only |
| Qual × Qual | Rand | $$\frac{2 \times \sum_u \sum_v n_{uv}^2 - \sum_u n_u^2 - \sum_v n_v^2 + N^2}{N^2}$$ | $1 - \frac{1}{D_u} - \frac{1}{D_v} + \frac{2}{D_u D_v}$ |
| Cont × Qual (U × V) | Standard Dev. Crossing | $\frac{\sigma(V_{u/v})}{\sigma(V_u)}$ | 0.5 |
| Cont × Cont | Linear Correlation | $\frac{CoVar(V_U, V_V)}{\sigma_{U^\circ} \times \sigma_V}$ | 0.5 | where

- $n_{uv}$ = number of rows or tuples having the value u for $V_U$ and v for $V_V$
- $n_U$ = number of rows or tuples having the value u for $V_U$
- $n_v$ = number of rows or tuples having the value v for $V_V$
- $D_U$ = dimension of variable $V_U$
- $D_V$ = dimension of variable $V_V$
- N = n . . . = number of rows or tuples
- $Y_v$ = mean of the $V_u$ values for the rows or tuples having the value of V
- $V_{u/v}$ = variable built with the standard deviation of Y In the case of qualitative variables, the above formulas for $\chi^2$ and Rand may be used alternatively or in conjunction. The formula for the Goodman-Kruskal is used only for the purpose of analyzing which variable implies the other one in a given association.

In each case, the formula is computed at the respective step 61 or 63 and the result is compared to the limit formula value at step 64. When the resulting value is greater than the limit value, the two variables are considered as associated or correlated. In the case of an S×S' association, this leads to the determination at step 65 of nonselected variables which are correlated or otherwise associated with selected variables and can thus be triggered as extension variables in results 66 of the variable extension process The record extension process for identifying records that are similar to the records selected in the query results at step 41 in FIG. 4 will now be described with reference to FIG. 7. In this process, the preferred embodiment of the invention is based on the definition of similarity values depending on the data type for the variables. For example, in the case of a variable K of the qualitative, categorical, single-valued type which can take p values, the similarity S between two records i and i__regarding variable K is 1 if i and i__have the same value for variable K, 0 if not.

More generally, the similarity computation is based on the data type and depends on the parameters of the data types (e.g., number of modalities). It is defined by a formula based on the unitary similarity of two records i and i__for a given variable K which is the following:

$uS_{i,i'}^K = \{1$ if I and I' have the same value for K and 0 otherwise$\}$

In the preferred embodiment, a regulated similarity is used instead of the unitary similarity above and is defined by:

$S_{i,i'}^K = a^K \times uS_{i,i'}^K$ where $a^K$ is a factor depending on the data type and computed according to the following formulas.

Where the variable may take a large number of different values, the formula is $A^K = (1-(1/p_K))$ where $p_K$ is the total for the variable.

Variables in this first category are identified by a value 1 in the S. FLAG column of Data Dictionary table 27 in FIG. 2.

Where there is a high dispersion of values for the variable among the rows, the formula is:

$$a^K = \frac{1}{S_i^K}$$

is the number of rows having the same value as i for variable K.

Variables in this second category are identified by a value 2 in the S. FLAG column of Data Dictionary table 27.

For all other variables, the formula is simply $a^K = 1$ and the S. FLAG value is set at 3 in Data Dictionary table 27.

The above three similarity types are the ones currently preferred for the best mode of carrying out the invention, but it will be clear to the skilled person that other types may be defined and used without departing from the spirit and scope of the invention.

Using the above similarity computations for each variable, an overall similarity $S_{i,i\_}$ is computed for the two rows i and $i_{13}$ as follows:

$$S_{i,i'} = \sum_K S_{i,i'}^K$$

The rows (records) for which the overall similarity to the ones retrieved by the initial query is above a predetermined threshold are added to the list X0 as additional records X1 as shown in FIG. 3.

Figure 7:
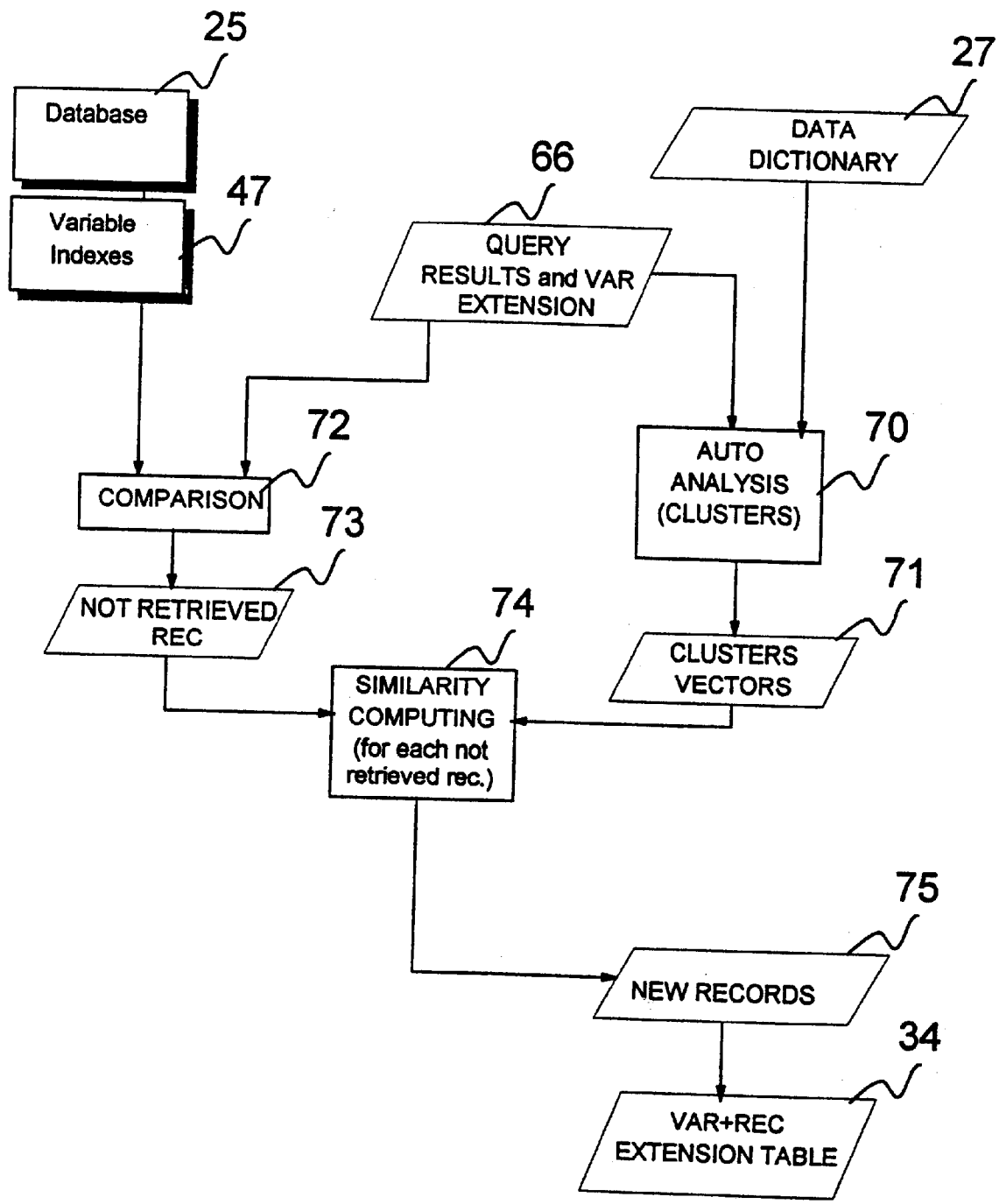
FIG. 7 schematically exhibits the record extension process according to the invention.

The detailed process for the record extension will now be described with reference to FIG. 7. The process starts with the query and variable extension results 66 obtained at the end of the-variable extension process of FIG. 6. These results are analyzed at step 70 in connection with Data Dictionary table 27 by classical autoanalysis techniques which are not part of this invention. The purpose of these techniques is to group the results in clusters according to typology classifications. The clustering process is based on the total list of selected variables, that is to say the union of the Y0 and Y1 sets of variables, and results in each record in results 66 being allocated a cluster number. In the preferred embodiment of the invention, a cluster vector is defined for each cluster at step 71. The vector is representative of all the records in the cluster, i.e., the center of gravity of the rows pertaining to the cluster. It is useful to use the cluster vectors in the following steps of the process instead of the records themselves as this helps in limiting the amount of computations required. Cluster information can also be utilized to prepare display analysis results as shown at step 45 in FIG. 4 to help the user interpret the results.

Query and variable extension results 66 are also compared at step 72 with the total list of records in table 26 of database 25 to produce a list of all records 73 not retrieved in the query results (i.e., not part of the X0 set). As previously mentioned, the preferred embodiment uses variable indexes 47 rather than the full records from the database to limit the amount of computations required. Similarity computing takes place at step 74 where a similarity value is computed for each record 73 with respect to each cluster vector 71. If the maximum similarity value found for a given record is above a predetermined threshold, this record is selected for the record extension list 75. If not, the record is not taken into account. In the preferred embodiment, with the computation formulas indicated above, the predetermined threshold is set at 0.5, but it will be clear for the skilled person that this parameter can be set at a different value or made tunable to meet different specific needs. When all records have gone through similarity computing step 74, the list of new records 75 is utilized for building table 34 of FIG. 3 for presentation to the user.

In the example shown in FIG. 2, the record extension process might lead to the additional selection of records "Jones" and "Sigli". As already mentioned, result analysis and clustering techniques, which are outside the scope of this disclosure, can be used to bring-additional information to the user as to the reasons why the extended variables and records have been selected and thus help the user in the interpretation of the extended results.

Once the extensions of the variables (columns) and lines (records) have been carried out to arrive at table 34, the whole extension process can be iterated as shown in FIG. 3. Table 34 is then used as a starting point instead of table 31. The control of the iteration process may be manual for each step (variables extension then rows), or manual for a full extension (the two steps are started in one command), or else automatic as soon as the query results are available. The extension process takes place while the user is looking at the previous results. When the iteration process is automatic, a stop condition must be provided for. The stop condition is preferably one of the two following conditions: either as soon as the variable extension and row extension steps do not provide new data or when the size of the extended information is twice that of the information from the initial query results, whichever comes first.

It will be apparent to the skilled person that, although the described preferred embodiment provides for an extension in the variable field first and then an extension in the record field, it is possible to proceed in the reverse way, i.e., start with the record extension and then proceed to the variable extension. This reverse process is well within the scope of the present invention.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A machine-implementable method for automatic extension of results obtained by querying a database of relationally organized data and expressed in tabular row and column format, each database table including a plurality of rows (tuples) and a plurality of columns (variables) defined over counterpart domains of values, said method comprising the steps of:

(a) applying a formatted query designating at least one table, at least one column variable, and at least one predicate constraint to the designated table of said database and retrieving tuples of values satisfying the predicate constraints;

(b) computing indexes of association among the previously selected and nonselected column variables and modifying the formatted query to include those nonselected column variables having respective indexes of association exceeding a predetermined threshold; and (c) repeating steps (a) and (b) until a stop condition occurs.

2. The machine-implementable method according to claim 1, wherein said method further includes the steps of:

(d) computing values of similarity among the tuples returned by querying the designated table with the query in step (b); and (e) providing indicia of tuples returned according to the variables as extended in step (b) exhibiting predetermined similarity values, and providing indicia of tuples returned according to step (a).

3. A machine-implementable method for automatic extension of results obtained by querying a database of relationally organized data as expressed in tabular row and column format, each database table including a plurality of rows (tuples) and a plurality of columns (variables) defined over counterpart domains of values, said method comprising the steps of:

(a) formatting a query including designation of at least one table, at least one column variable, and at least one predicate constraint;

(b) querying the designated table to return tuples of values from and counterpart to predetermined ones of the column variables satisfying the predicate constraint;

(c) computing indexes of association among previously selected and nonselected column variables of said designated table;

(d) modifying the formatted query to include previously nonselected variables having respective indexes of association exceeding a predetermined threshold; and (e) querying said designated table with said modified query absent a stop condition to return tuples of values as revised in step (d).

4. The machine-implementable method according to claim 3, wherein said method further includes the steps of:

(f) computing values of similarity among the tuples returned by querying the designated table with the query in step (e); and (g) providing indicia of tuples returned according to the variables as extended in step (d) exhibiting predetermined similarity values, and providing indicia of tuples returned according to step (b).

5. The machine-implementable method according to claim 4, wherein the step of computing similarity among the tuples returned by querying the designated table with the query as modified in-step (e) comprises:

(f1) forming pairs of tuples, each pair including at least one tuple returned according to the query as expressed in step (b) and one tuple returned according to the query as modified by the previously nonselected variables in step (e);

(f2) computing, for each pair of tuples, a set of unitary similarity values with respect to each column variable included in the query as modified in step (d); and (f3) computing, for each of said pairs of tuples, an overall similarity, value by combining the unitary similarity values for that pair.

6. The machine-implementable method according to claim 3, wherein the step (d) of modifying the formatted query to include previously nonselected variables having respective indexes of association exceeding a predetermined threshold further includes the steps of:

(d1) computing a selection threshold for said indexes of association; and (d2) selecting the variables having indexes of association above said computed selection threshold.

7. A machine-implementable method for automatic extension of results obtained by querying a database of relationally organized data as expressed in tabular row and column format, each database table including a plurality of rows (tuples) and a plurality of columns (variables) defined over counterpart domains of values, said method comprising the steps of:

(a) formatting a query including designation of at least one table, at least one column variable, and at least one predicate constraint and querying the designated table to return tuples of values from and counterpart to predetermined ones of the column variables satisfying the predicate constraint;

(b) computing indexes of association among previously selected and nonselected column variables of said designated table and modifying the formatted query to include previously nonselected variables having respective indexes of association exceeding a predetermined threshold;

(c) querying said designated table with said modified query absent a stop condition to return tuples of values as modified in step (b);

(d) computing values of similarity among the tuples returned by querying the designated table with the query as modified in step (b); and (e) providing indicia of tuples returned according to the variables as extended in step (d) exhibiting predetermined similarity values, and providing indicia of tuples returned according to step (a).

8. The machine-implementable method according to claim 7, wherein the step (d) of computing similarity values includes the steps of:

(d1) forming pairs of tuples, each pair including at least one tuple returned according to the query as expressed in step (a) and one tuple returned according to the query as modified by the previously nonselected variables in step (b);

(d2) computing, for each pair of tuples, a set of unitary similarity values with respect to each column variable included in the query as modified in step (b); and (d3) computing, for each of said pairs of tuples, an overall similarity value by combining the unitary similarity values for that pair.

9. In a system having a processor and a storage subsystem coupling said processor, said storage subsystem including a database of relationally organized data as expressed in tabular row and column format, each database table including a plurality of rows (tuples) and a plurality of columns (variables) defined over counterpart domains of values, wherein said system further comprises:

(a) a first arrangement for applying a processor-formatted query designating at least one table, at least one column variable, and at least one predicate constraint to the designated table of said database in said storage subsystem and retrieving tuples of values satisfying the predicate constraints from said subsystem and staging them to the processor;

(b) a second arrangement in said processor for computing indexes of association among the previously selected and nonselected column variables and modifying the formatted query to include those nonselected column variables having respective indexes of association exceeding a predetermined threshold; and (c) a third arrangement for repeatedly invoking the first and second arrangements until a stop condition occurs.

10. The system according to claim 9, wherein said second arrangement includes:

(d) circuits for computing values of similarity among the tuples returned by querying the designated table with the query elicited by the second arrangement; and (e) a logic arrangement for providing indicia of tuples returned according to the variables as extended in step (b) exhibiting predetermined similarity values, and providing indicia of tuples returned elicited by the first arrangement.

11. The system according to claim 10, wherein said second arrangement includes a display for presentation of indicia; and an input device for entry of at least one stop condition.

12. An article of manufacture comprising a machine-readable memory having stored therein a plurality of processor-executable control program steps for automatic extension of results obtained by querying a database of relationally organized data as expressed in tabular row and column format, each database table including a plurality of rows (tuples) and a plurality of columns (variables) defined over counterpart domains of values, said control program steps include:

(a) a control program step for applying a formatted query designating at least one table, at least one column variable, and at least one predicate constraint to the designated table of said database and retrieving tuples of values satisfying the predicate constraints;

(b) a control program step for computing indexes of association among the previously selected and nonselected column variables and modifying the formatted query to include those nonselected column variables having respective indexes of association exceeding a predetermined threshold; and (c) a control program step for repeating control program steps (a) and (b) until a stop condition occurs.

13. The article of manufacture according to claim 12, wherein said control program steps further include:

(d) a control program step for computing values of similarity among the tuples returned by querying the designated table with the query in control program step (b); and (e) a control program step for providing indicia of tuples returned according to the variables as extended in control program step (b) exhibiting predetermined similarity values, and for providing indicia of tuples returned according to control program step (a).

* * * * *